Feb. 12, 1929.

A. JENSEN 1,701,777

APPARATUS FOR PASTEURIZING LIQUIDS

Original Filed Feb. 2, 1926   3 Sheets-Sheet 3

Inventor
Aage Jensen
By Percy B. Hills
Attorney

Patented Feb. 12, 1929.

1,701,777

UNITED STATES PATENT OFFICE.

AAGE JENSEN, OF LOS ANGELES, CALIFORNIA.

APPARATUS FOR PASTEURIZING LIQUIDS.

Original application filed February 2, 1926, Serial No. 85,471. Divided and this application filed June 21, 1926. Serial No. 117,446.

My invention relates to the treatment of liquids, for the removal therefrom of deleterious gases, said removal occurring while the liquid is being pasteurized or otherwise treated, and has for its objects to provide an improved apparatus for accomplishing this purpose without destroying or materially changing the physical or chemical structure of the liquid, the apparatus involved being extremely simple and highly efficient.

The present case is a division of an application filed by me February 2, 1926, Serial No. 85,471, and is intended to cover the apparatus disclosed in said parent application for carrying out the method disclosed therein.

The apparatus hereinafter described and illustrated in the accompanying drawings, shows a form readily applicable to the treatment of milk or cream, in which harmful gases are known to be present. These gases may be the result of organic changes, or they may be the outcome of bacteria growth, caused by absorbed flavors or improper feeding of the dairy cattle. Much trouble is encountered from the latter, and it is a common objection in many sections of the country between seasons, when the cattle crave change of diet and feed on weedy plants. Undesirable flavors from other causes are known to be present in milk and cream practically the entire year through, and can be traced to the feeding of turnips, silo, kale, certain legumes, etc.

In the accompanying drawings.

Similar numerals of reference denote corresponding parts in the several views.

Figure 1:
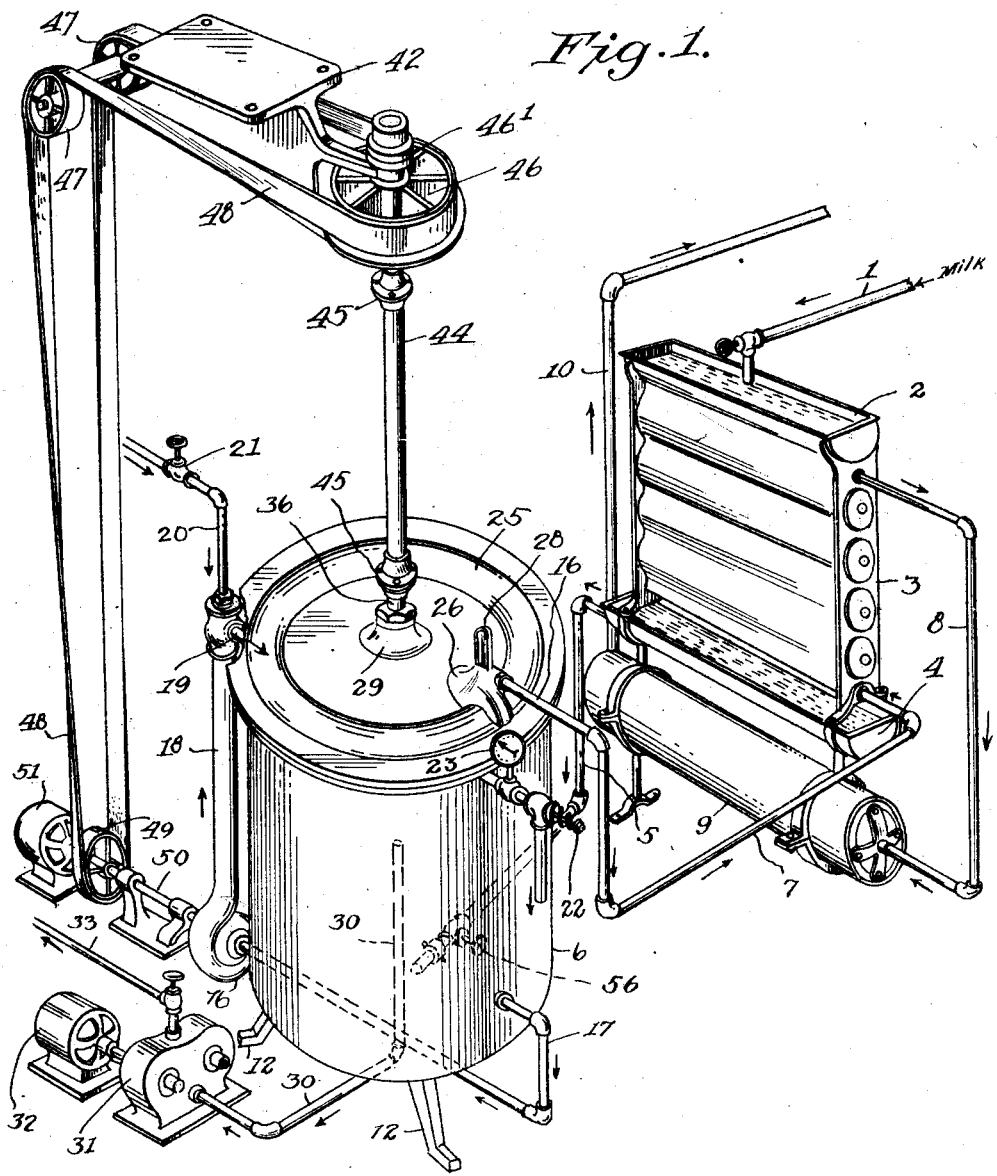
Figure 1 is a perspective view of a complete assembly including my improved pasteurizer.
Figure 2:
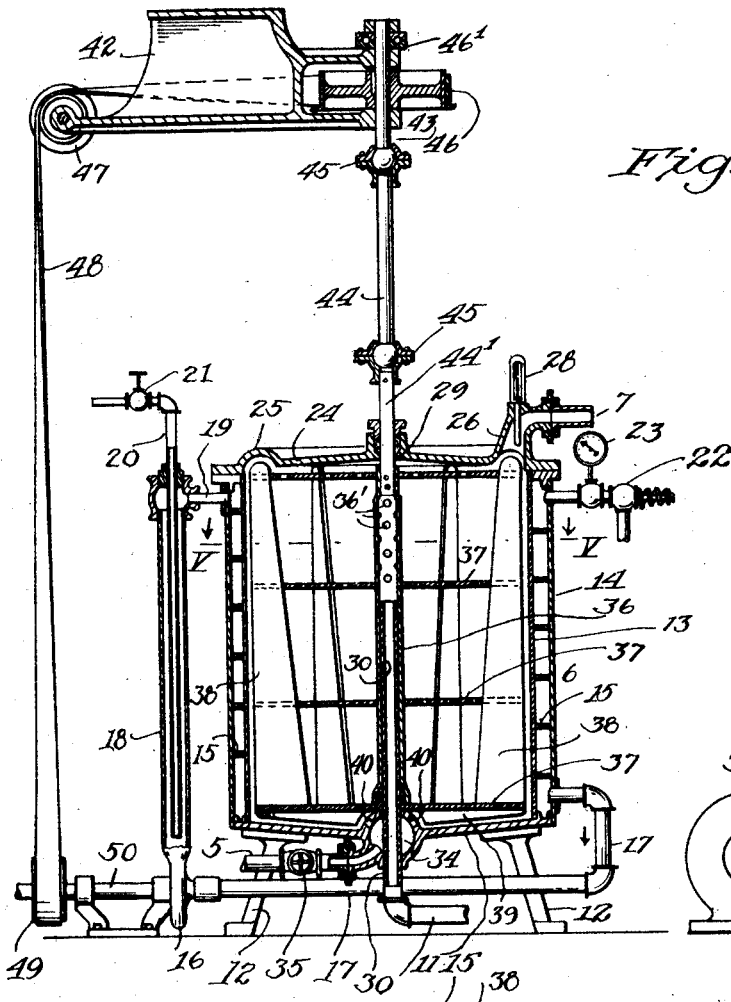
Figure 2 is a central vertical sectional view of the pasteurizer and its operating parts.

In the said drawings, referring more particularly to Figure 1, the reference numeral 1 denotes a pipe for supplying the liquid to be treated, the same discharging into the upper tank 2 of a regenerator 3 of the general type disclosed in Letters Patent No. 1,073,989, granted to me September 23, 1913, said liquid after passing through said regenerator discharging into the lower tank 4 thereof, from which it is led by pipe 5 into the pasteurizer 6 hereinafter described, wherein it is treated for the renewal of gases, and is discharged therefrom through pipe 7 into the lower end of the regenerator 3 up which it passes to impart its heat to the incoming liquid, and from which it is discharged through the pipe 8 to the cooler 9, from which leads a pipe 10 to carry away the treated liquid.

Referring specifically to the pasteurizer 6, the same comprises a metal base 11 supported on legs 12, fastened to which is a cylindrical lining 13 which forms an integral part of a heating jacket 14 constructed with a helical circulating channel 15. A circulating pump 16 is connected with suction pipe 17 and discharge pipe 18, which latter returns to the jacket 14 through connecting pipe 19. Disposed in discharge pipe 18 is a perforated steam pipe 20 having a controlling valve 21. Conveniently located at the upper portion of the jacket 14 is a pressure release valve 22 and a pressure gage 23, their function being to control and indicate the pressure in the jacket 14, which in turn will reflect the temperature of the circulating medium used.

Figure 6:
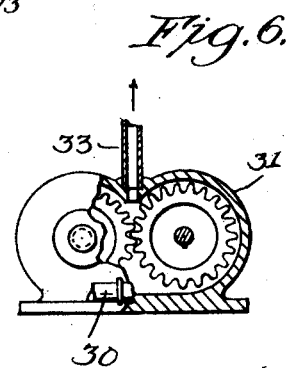
Figure 6 is a detail view partly in section of the suction pump employed with the apparatus.
Figure 5:
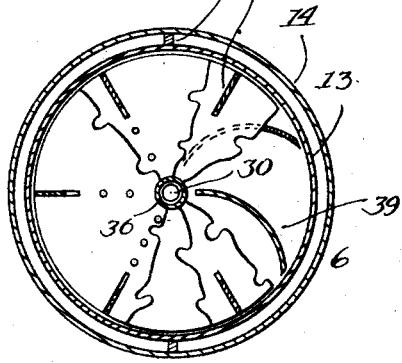
Figure 5 is a horizontal sectional view, taken on the line V—V of Figure 2.

On top of the cylindrical lining 13 is mounted a cover 24 having an annular channel 25 merging into a discharge outlet 26 to which is attached the pipe 7 and in which is located a temperature indicating device 28. In the center of the cover 24 is located a suitable packed bearing 29, while through the center of the base 11 is projected a stationary pipe 30 extending upward within the pasteurizer to a suitable height to permit correct functioning. This pipe serves, first, as a vertical guide for the exhaust rotor, hereinafter described; and, secondly, as a draw-off pipe connected to the suction pump 31, shown in detail in Figure 6, the same being driven by a suitable electric motor 32 and discharging through pipe 33. Formed centrally in the base 11, surrounding the pipe 30, is a chamber 34 into which the liquid to be treated is introduced by pipe 5, said pipe being controlled by a suitable valve 35.

Figure 3:
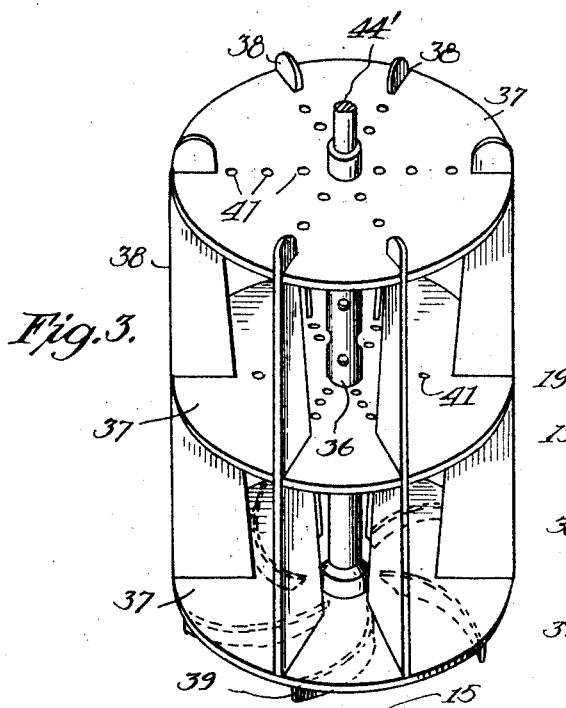
Figure 3 is a detail perspective view of the exhaust rotor of said pasteurizer.

In Figure 3 I have shown in detail the exhaust rotor within the pasteurizer 6, which is constructed especially to withstand high speed and with attendant ability to develop pressure. The embodiment of the same embraces a hollow shaft 36 adapted to fit over the tube 30 and fastened to which are two or more cylindrical disks 37, said disks serving to carry vertical vanes 38 and also to confine the liquid being treated so as to prevent splashing in its passage through the pasteurizer. The bottom disk 37 is imperforate, and is fitted with radial vanes 39 in order to secure a maximum centrifugal action on the liquid entering from the chamber 34 through the apertures 40, said vanes also serving to prevent the exhaust fan or pump 31 from drawing out the liquid being treated. The remaining disks 37 are provided with apertures 41 to permit the free passage therethrough of gases in the liquid so that they may escape toward the exhaust outlet through the pipe 30, as hereinafter described. That portion of the hollow shaft 36 which lies above the upper end of the pipe 30, is provided with a plurality of apertures 36' to provide communication between the interior of the pasteurizer and said pipe 30. Said exhaust rotor is intended to be supported independently of the pasteurizer casing and to accomplish this I provide a combined overhead drive and support for the same carried by a casting 42. Said drive comprises a drive shaft 43, connected to the hollow shaft 36 by intermediate shaft connections 44, 44', having suitable detachable joints 45, said shaft 43 having fixed thereto a pulley 46 and being carried by suitable thrust bearing 46' designed to support the weight of the rotor and its parts. Running from said pulley 46 over idler pulleys 47 is a drive belt 48, extending to a pulley 49 mounted on shaft 50 driven by a suitable electric motor 51. The circulating pump 16 is also driven by said shaft 50, as clearly shown in Figure 1.

The operation of my improved apparatus is as follows: The apparatus is cleaned and steam then turned on through valve 21 and circulated through the jacket of the pasteurizer by means of the pump 16. As soon as the desired temperature has been obtained, the liquid to be treated is introduced through pipe 5, its flow being regulated by the valve 56 therein. The speed of the suction pump 31 is gaged to produce a predetermined partial vacuum in the pipe 30, which at all times must balance with the pressure in the pasteurizer, and also must be maintained in proper relation to the boiling pressure of the liquid being treated as the temperature of the same increases progressively. The liquid entering chamber 39 is discharged through apertures 40 into the interior of the pasteurizer 6, and is subjected, first, to the action of the radial vanes 39 to impart a centrifugal movement thereto, and as it rises in the pasteurizer, is subjected further to the action of the vertical vanes 38, the latter rotating at high speed; the result being that the liquid gradually rises in the pasteurizer, but is kept away from the hollow shaft 36, and is discharged first into the annular channel 35 and from thence into the discharge 26 and its pipe 7, whereby it is conveyed to the lower end of the regenerator 3, as hereinbefore described.

It will be observed that while the liquid is being so treated in the pasteurizer 6, the deleterious gases are being withdrawn constantly by the centrifugal pump 31, acting on pipe 30 and discharging through pipe 33.

While the apparatus shown is adapted especially for the treatment of milk and cream, I do not wish to limit myself to the treatment of these products, as there are many other liquids that can be treated beneficially by my apparatus.

Figure 7:
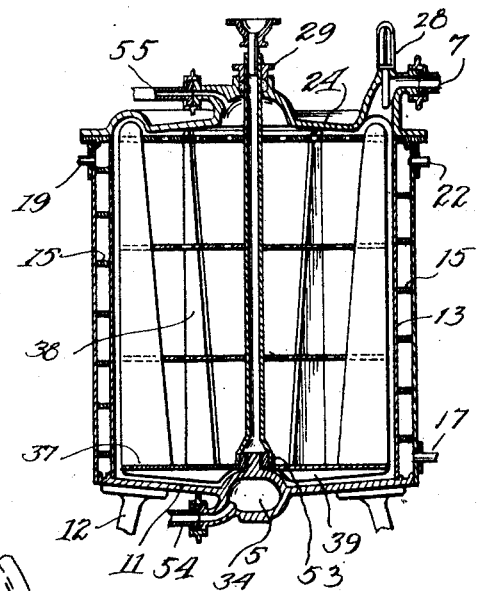
Figure 7 is a sectional view of the pasteurizer showing a slightly modified construction.
Figure 4:
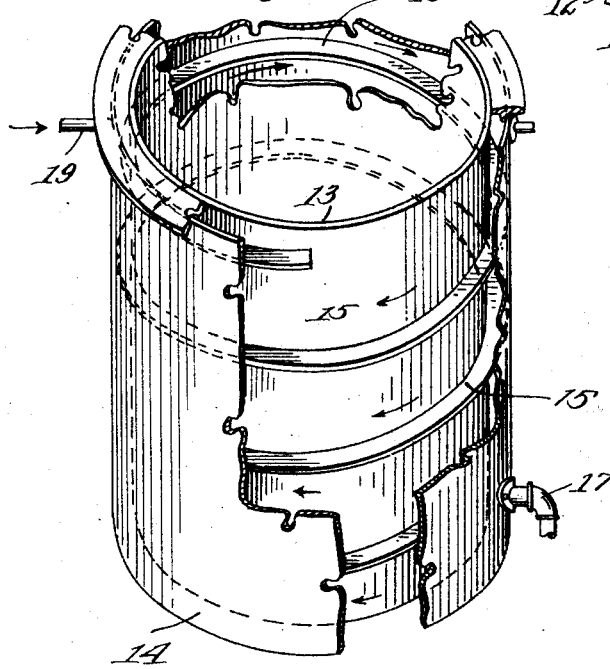
Figure 4 is a detail perspective view partly broken away of the pasteurizer.

In Figure 7, I have shown a slightly modified construction wherein the central pipe 30 is dispensed with and the lower end of the rotor mounted upon a stub bearing 53 formed on top of the chamber 34, said chamber being supplied with the liquid to be treated by a pipe 54 discharging directly thereinto and leading from the tank 4 of the regenerator 3. The discharge of gases is through a pipe 55 tapped centrally into the top of the cover 24, said pipe 55 leading to the suction pump 31.

Having thus fully described my invention, what I claim as new and desire to secure by Letters Patent, is:—

1. An apparatus for pasteurizing liquids, comprising a jacketed chamber adapted to receive in said jacket a heating medium under pressure, an inlet for the liquid to be treated in the bottom of said chamber, a rotor in said chamber adapted to force said liquid centrifugally upward in said chamber and to discharge the same peripherally, and a central pipe in said chamber forming the bearing for said rotor and serving to withdraw deleterious gases from said chamber.

2. An apparatus for pasteurizing liquids, comprising a jacketed chamber adapted to receive in said jacket a heating medium under pressure, an inlet for the liquid to be treated in the bottom of said chamber, a rotor in said chamber adapted to force said liquid centrifugally upward in said chamber and to discharge the same peripherally, a central pipe projecting upward part way in said chamber, an exhaust pump connected with the lower end of said pipe, a hollow perforated shaft fitted over said pipe and fixed to said rotor, and means for supporting and driving said rotor through said hollow shaft.

3. An apparatus for pasteurizing liquids, comprising a chamber, means for applying heat to said chamber, a central inlet for liquid in the bottom of said chamber, a rotor within said chamber comprising horizontal disks and horizontal and vertical vanes for forcing the liquid peripherally upward in said chamber, and a drive for said rotor supporting the same freely in said chamber.

4. An apparatus for pasteurizing liquids, comprising a chamber, means for applying heat to said chamber, an inlet for liquid to be treated at the bottom of said chamber, a pipe projecting centrally upward part-way in said chamber, an exhaust pump connected with said pipe, a rotor within said chamber for driving the liquid centrifugally upward therein, a hollow shaft fixed to said rotor, fitting over said pipe and having apertures in the upper portion of the same, and means for supporting and rotating said shaft.

5. An apparatus for treating liquids, comprising a chamber for containing liquids to be treated, a rotor within said chamber, a hollow vertical shaft for said rotor, anti-friction means for supporting the upper end of said shaft, means for rotating said shaft and rotor at a sufficiently high rate of speed to throw the liquids away from said shaft and a vacuum producing device for drawing gases and vapors emanating from the liquids through said hollow shaft.

6. An apparatus for treating liquids, comprising a chamber for containing liquids to be treated, a rotor within said chamber, a hollow vertical shaft for said rotor, means for rotating said shaft and rotor at a sufficiently high rate of speed to throw the liquids away from said shaft and a vacuum producing device for drawing gases and vapors emanating from the liquids through said hollow shaft.

7. An apparatus for treating liquids, comprising a chamber for containing liquids to be treated, means within said chamber for strongly rotating said liquid to form a central zone void of liquids and vacuum producing means connected to said zone for withdrawing gases and vapors emanating from said liquids.

In testimony whereof I hereunto affix my signature.

AAGE JENSEN.